(12) United States Patent
Field (10) Patent No.: US 9,344,289 B2
(45) Date of Patent: *May 17, 2016

(54) CONTROL OF MULTICAST CONTENT DISTRIBUTION

(71) Applicant: Comcast Cable Communications, LLC, Philadelphia, PA (US)

(72) Inventor: Brian E. Field, Evergreen, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,773

(22) Filed: Feb. 23, 2015

(65) Prior Publication Data

US 2015/0236865 A1    Aug. 20, 2015

Related U.S. Application Data

(63) Continuation of application No. 12/779,134, filed on May 13, 2010, now Pat. No. 8,995,439.

(51) Int. Cl.
*H04L 12/28* (2006.01)
*H04L 12/18* (2006.01)
*H04L 29/06* (2006.01)

(52) U.S. Cl.
CPC .......... *H04L 12/185* (2013.01); *H04L 65/4076* (2013.01)

(58) Field of Classification Search
CPC .............. H04L 12/185; H04L 65/4076; H04L 12/1859; H04L 12/1886
See application file for complete search history.

(56) References Cited

U.S. PATENT DOCUMENTS 6,970,461 B2 * 11/2005 Unitt .................... H04L 12/185
348/E7.07
7,567,565 B2    7/2009 La Joie
(Continued)

FOREIGN PATENT DOCUMENTS

CA    2739298        5/2011
EP    1715628 A1    10/2006
(Continued)

OTHER PUBLICATIONS

European Office Action—EP 11165418.2—Dated Apr. 23, 2015.
(Continued)

*Primary Examiner* — Brian O'Connor
(74) *Attorney, Agent, or Firm* — Banner & Witcoff, Ltd.

(57) ABSTRACT

A local router stores a content distribution map that specifies a plurality of permitted multicast groups. The local router receives communications from user devices on an access-network side of the local router. Those received communications identify multicast groups for which user devices wish to receive data. The local router ascertains if those identified multicast groups are permitted multicast groups specified by the stored content distribution map. For multicast groups ascertained to be permitted multicast groups, the local router sends communications across a network-side interface requesting membership in those multicast groups. The local router may then receive data for those multicast groups and forward that data to user devices. For multicast groups identified in user device communications ascertained not to be permitted multicast groups, the local router sends no communications across the network-side interface requesting membership.

20 Claims, 5 Drawing Sheets

(56) References Cited

U.S. PATENT DOCUMENTS

| | | | |
|---|---|---|---|
| 7,623,517 B2 | 11/2009 | Suzuki | |
| 7,640,301 B2 * | 12/2009 | Walter | H04N 7/152 709/204 |
| 7,716,662 B2 | 5/2010 | Seiden | |
| 7,792,112 B2 * | 9/2010 | Niu | H04L 12/185 370/390 |
| 7,817,632 B2 | 10/2010 | Engstrand | |
| 7,881,244 B2 | 2/2011 | Balay et al. | |
| 7,936,752 B2 * | 5/2011 | Boers | H04L 12/185 370/390 |
| 7,969,980 B1 | 6/2011 | Florit et al. | |
| 7,983,262 B1 | 7/2011 | Bishara | |
| 8,054,849 B2 * | 11/2011 | Nadarajah | H04L 12/185 370/217 |
| 8,121,124 B2 | 2/2012 | Baykal et al. | |
| 8,144,617 B2 | 3/2012 | Watanabe | |
| 8,254,385 B2 | 8/2012 | Field | |
| 8,266,249 B2 * | 9/2012 | Hu | H04L 12/2898 709/219 |
| 8,291,459 B2 | 10/2012 | Athias | |
| 8,345,540 B2 | 1/2013 | Rollins | |
| 8,467,405 B2 | 6/2013 | Suzuki | |
| 8,468,568 B2 | 6/2013 | Urban et al. | |
| 8,522,288 B2 * | 8/2013 | Ikeda | H04L 12/1877 725/105 |
| 8,588,249 B2 | 11/2013 | Wheelock | |
| 8,611,348 B2 * | 12/2013 | Boers | H04L 12/185 370/390 |
| 8,775,503 B2 * | 7/2014 | Sebastian | H04L 12/1859 709/203 |
| 8,880,719 B2 * | 11/2014 | Cooper | H04L 12/185 370/401 |
| 8,995,439 B2 * | 3/2015 | Field | H04L 12/185 370/241 |
| 2003/0088696 A1 | 5/2003 | McCanne | |
| 2006/0200561 A1 * | 9/2006 | Tsuhara | H04L 12/1881 709/226 |
| 2007/0076716 A1 | 4/2007 | Jang | |
| 2007/0220575 A1 | 9/2007 | Cooper et al. | |
| 2008/0189298 A1 | 8/2008 | Cha | |
| 2008/0249961 A1 | 10/2008 | Harkness et al. | |
| 2010/0046513 A1 | 2/2010 | Park et al. | |
| 2010/0061369 A1 | 3/2010 | Suzuki | |
| 2010/0185759 A1 | 7/2010 | Wu | |
| 2010/0322134 A1 | 12/2010 | Wu | |
| 2011/0107364 A1 | 5/2011 | Lajoie et al. | |
| 2011/0231273 A1 | 9/2011 | Buchheit | |
| 2011/0249551 A1 | 10/2011 | Rollins | |

FOREIGN PATENT DOCUMENTS

| | | |
|---|---|---|
| EP | 1858262 A1 | 11/2007 |
| EP | 11165418.2 | 5/2011 |
| WO | 0245334 A1 | 6/2002 |
| WO | 2005071903 A1 | 8/2005 |
| WO | 2006077575 A1 | 7/2006 |

OTHER PUBLICATIONS

Internetworking Technologies Handbook, Chapter 43 ("Internet Protocol Multicast"), published prior to Jun. 24, 2009.

"Introduction to IGMP for IPTV Networks," published prior to Jun. 24, 2009.

"Introduction to Multicast," (http://www.firewall.cx/multicast-intro.php), downloaded Jun. 24, 2009.

"Multicast IP List," (http://www.firewall.cx/multicast-ip-list.php), downloaded Jun. 24, 2009.

RFC 3810, "Multicast Listener Discovery Version 2 (MLDv2) for IPv6," Jun. 2004.

RFC 2236, "Internet Group Management Protocol, Version 2," Nov. 1997.

RFC 3376, "Internet Group Management Protocol, Version 3," Oct. 2002.

RFC 4601, "Protocol Independent Multicast—Sparse Mode (PIM-SM): Protocol Specification (Revised)," Aug. 2006.

European Search Report in EP11165418 dated Aug. 8, 2011.

Response to European Office Action—EP Appl. 11165418.2—submitted Sep. 23, 2015.

* cited by examiner

| Service indentifier | Format | Coding | Bandwidth | Multicast addr. | R joined | UD joined | Str/Obj | Attribute 01 | ••• | Attribute j |
|---|---|---|---|---|---|---|---|---|---|---|
| <service id> | <format> | <CODEC> | <bw reqm't> | <mcast IP dest__> | <y/n> | <y/n> | <s/o> | <value(s)> | ••• | <value(s)> |
| <service id> | <format> | <CODEC> | <bw reqm't> | <mcast IP dest__> | <y/n> | <y/n> | <s/o> | <value(s)> | ••• | <value(s)> |
| <service id> | <format> | <CODEC> | <bw reqm't> | <mcast IP dest__> | <y/n> | <y/n> | <s/o> | <value(s)> | ••• | <value(s)> |
| <service id> | <format> | <CODEC> | <bw reqm't> | <mcast IP dest__> | <y/n> | <y/n> | <s/o> | <value(s)> | ••• | <value(s)> |
| ••• | ••• | ••• | ••• | ••• | ••• | ••• | ••• | ••• | ••• | ••• |

CONTROL OF MULTICAST CONTENT DISTRIBUTION

CROSS REFERENCE TO RELATED APPLICATIONS

The present application is a continuation of co-pending U.S. non-provisional application Ser. No. 12/779,134, filed May 13, 2010, which is hereby incorporated by reference in its entirety.

BACKGROUND

Operators of networks often provide numerous types of data, video and/or audio content to the premises of network users. Such content may include programming from broadcast television networks (e.g., ABC, CBS, NBC), from "cable" programming service providers (e.g., HBO, ESPN), programming from local television stations, and numerous other types of content. Numerous techniques have been used to deliver content data to users over coaxial cable, fiber optic cable and other types of physical media. In many cases, a physical medium connected to a user premises will continuously deliver each of multiple content-containing services that are available to the user. For example, one set of services may be carried in a first frequency band, a second set of services in a second frequency band, etc. A user wishing to view content from one of those services may utilize a device to tune to the appropriate frequency sub-band and isolate data packets in the frequency sub-band for the desired content.

In recent years, internet protocol (IP) television (IPTV) techniques have been developed to deliver some types of programming content in a unicast setting, such as a video-on-demand service. Using such techniques in a multicast environment presents additional challenges, however. In particular, business and/or regulatory restrictions may limit the users to whom, and/or the regions where, certain types of content can be provided. As one example, a "blackout" provision in network operator's contract with a sports franchise or programming service provider may prohibit delivering coverage of a particular sports event in certain areas. If the network operator uses IP multicast techniques to deliver that programming, a user in a blacked-out region obtaining the IP multicast group address for that coverage could potentially circumvent the blackout by seeking to join the multicast group. Known solutions to this problem (e.g., encrypting content, stopping content at a local router serving the user) have been less than satisfactory.

SUMMARY

This Summary is provided to introduce a selection of concepts in a simplified form that are further described below in the Detailed Description. This Summary is not intended to identify key features or essential features of the invention.

In at least some embodiments, a local router in a packet data network stores, or has access to, a content distribution map that specifies a plurality of permitted multicast groups. The local router receives communications from user devices on an access-network side of the local router. Those received communications identify multicast groups for which user devices wish to receive data. The local router ascertains if those identified multicast groups are permitted multicast groups specified by the stored content distribution map. For multicast groups ascertained to be permitted multicast groups, the local router sends communications across a network-side interface requesting membership in those multicast groups. The local router may then receive data for those multicast groups and forward that data to user devices. For multicast groups identified in user device communications and ascertained not to be permitted multicast groups, the local router will not enable provision of unauthorized programming, and/or will send no communications across the network-side interface requesting membership.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Some embodiments of the invention are described by example of a national packet data network using internet protocol (IP) to deliver content to user devices. As used herein, "content" includes, for example, video images, audio sounds and other forms of information that can be encoded into data for communication to a user device, and then decoded so as to be displayed or otherwise conveyed in understandable form. Examples of content include, but are not limited to, audio and video communications associated with a television program, a video on demand (VOD) movie, or other media asset. A "user" may be a person, corporation or other entity that has access to one or more services from a network. Such arrangements may or may not involve a fee and/or subscription agreement. A "user device" is a device, positioned at a user premises or other location, that receives content data from a network. The device may display or otherwise render the data, or may output that data in a form usable by another device (e.g., a television, a computer, a local network in the user premises).

Although embodiments of the invention include networks that employ internet protocol ("IP networks"), an IP network is not synonymous with the Internet (with a capital "I," sometimes known as the "public" Internet). Although an IP network may include portions that utilize the public Internet for some links, an IP network could also be a completely private network or a combination thereof. Embodiments of the invention include networks using one or more different versions of internet protocol (e.g., IPv4 and/or IPv6). For convenience, exemplary multicast IP addresses used when discussing aspects of the disclosure will be in the form "<mcast IP dest______>." Actual formats of IPv4 and IPv6 addresses, as well as ranges of such addresses that may be set aside for multicast purposes, are well-known and described in Internet Engineering Task Force (IETF) Requests for Comments (RFC) and in other standards.

Figure 1:
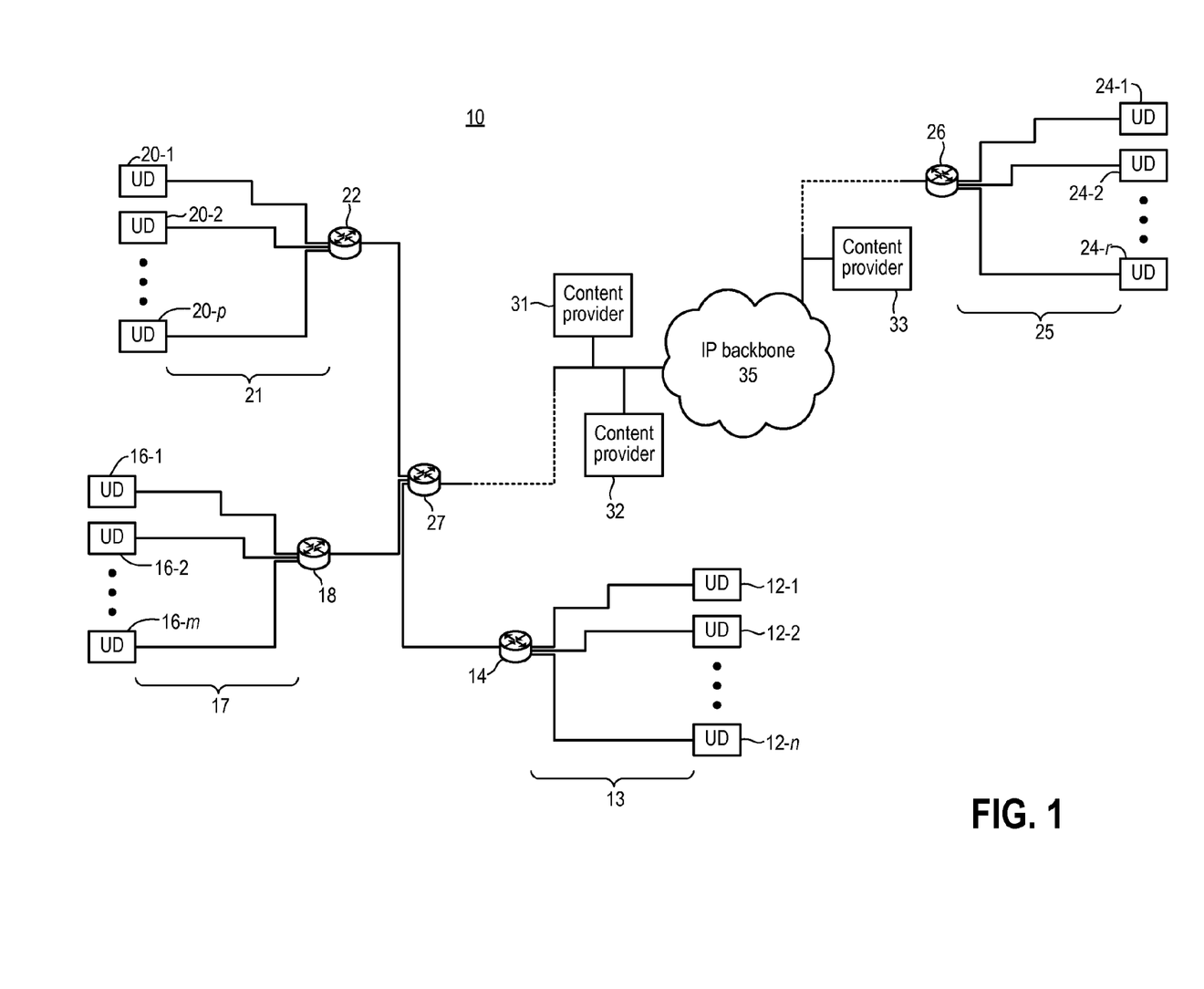
FIG. 1 is a block diagram showing portions of a packet data network implementing techniques and devices according to at least some embodiments.

FIG. 1 is a block diagram showing portions of an exemplary packet data network 10 capable of implementing devices and methods according to at least some embodiments. An operator of network 10 may provide numerous types of content to one or more user premises. For example, user devices ("UD") 12-1 through 12-n located at different user premises may communicate over an access network 13 with a local router 14. Devices 12-1 through 12-n may be set top terminals, televisions, computers, mobile devices, and the like. As used throughout this description and in the drawings, an italicized lower case letter merely indicates an arbitrary number. Different letters may represent the same or different numbers (e.g., access network 13 with user devices 12-1 through 12-n may have more, fewer or the same number of user devices as access network 17 with user devices 16-1 through 16-m).

In some embodiments, access network 13 may be a hybrid fiber-coax (HFC) network that includes electro/optical nodes, splitters, amplifiers, QAM modulators and other elements not shown in FIG. 1. In other embodiments, access network 13 could be a Fiber To The Home (FTTH) passive optical network (PON) having Optical Line Terminals (OLTs), splitters, amplifiers, Optical Network Terminals (ONTs) and other elements not shown in FIG. 1. In such an embodiment, a user device may be an ONT or an ONT in combination with other devices at a user premises. In still other embodiments, access network 13 could be a WiMAX or other type of wireless access network. In such an embodiment, a user device might be a wireless transceiver or a wireless transceiver in combination with other devices at a user location. In yet other embodiments, access network 13 may be a digital subscriber line (DSL) network. In such an embodiment, a user device might be a DSL modem or a DSL modem in combination with other devices at a user premises. Access network 13 and/or user devices could take still other forms in other embodiments. Indeed, network 10 could include a combination of similar or different types of access networks (e.g., one access network could be an HFC network and another access network could be a FTTH network). In embodiments employing other types of access networks and/or user devices, operations, methods and devices similar to those described herein can be performed or used.

Data may be sent downstream from local router 14 to one or more of user devices 12-1 through 12-n in internet protocol (IP) packets. In addition to content data, downstream data could include user device provisioning data, system management messages and other types of data. Upstream messages from user devices 12-1 through 12-n to local router 14 similarly may be sent in IP packets. Examples of upstream messages from user devices include multicast group "join" and "leave" requests as described below.

Network 10 may include numerous additional local routers that communicate content data and other downstream data to user devices in IP packets, and that may receive multicast join and leave requests (and other messages), from user devices in IP packets. For simplicity, only four such additional local routers are shown in FIG. 1. For example, local router 18 communicates with user devices 16-1 through 16-m over an access network 17, local router 22 communicates with user devices 20-1 through 20-p over an access network 21 and local router 26 communicates with user devices 24-1 through 24-r over an access network 25. Each of local routers 14, 18 and 22 may communicate through a regional router 27 and one or more additional upstream routers (not shown) with various content data providers. Some of those content providers (e.g., providers 31 and 32) may, for example, be in the same local region as router 27. Other content providers (such as provider 33) may be located in more distant regions and accessed via a national IP backbone 35.

In some cases, a content provider may have a single server. In other cases, a content provider could have a data distribution center controlled by an operator of network 10 or by another entity. One example could include a regional or national hub where the operator of network 10 receives programming from multiple sources (e.g., fee-based programming service providers, broadcast networks, local television stations, etc.) via various mechanisms (e.g., satellite downlink, data feed over a separate network, etc.) and then distributes that content to users in network 10. Another example could include a point of presence (POP) maintained by the operator of network 10 in a facility operated by a single cable programming service provider, local television station or broadcast network. Yet another example could be a provider of Pay Per View (PPV) programming.

In at least some embodiments, content data from providers 31, 32 and 33 is distributed over network 10, using IP multicast techniques, to a large number (thousands, hundreds of thousands, or even millions) of individual users. In particular, data packets for a particular content (e.g., packets containing encoded audio and/or video data, or other data) are assigned a multicast destination IP address. This multicast destination IP address may be assigned by the content provider or by an element of network 10 receiving data from the provider. Upon receiving an IP packet with a multicast destination IP address, a router in network 10 forwards the packet on output ports that correspond to network elements (e.g., other network routers, user devices) that have joined a multicast group associated with the multicast destination IP address.

For example, provider 33 may offer programming service A assigned a multicast IP address of <mcast IP dest01>. Further, a user of user device 12-1 may wish to view service A, but none of user devices 12-1 through 12-n is a member of the <mcast IP dest01> multicast group. Upon receiving an appropriate user input, user device 12-1 sends a join request to local router 14 that includes <mcast IP dest01> and requests that data packets having that destination IP address be forwarded to user device 12-1. In at least some embodiments using IPv4, the user device join request may be in accordance with Internet Group Membership Protocol (IGMP). Such embodiments include embodiments employing IGMP version 2 (described, e.g., in IETF RFC 2236) and/or IGMP version 3 (described, e.g., in IETF RFC 3376). In an IGMP version 2 join request, a user device seeking to join a multicast group need only specify the group of interest. In an IGMP version 3 join request, a user device seeking to join a multicast group specifies the source and group ("S,G"). In at least some embodiments using IPv6, the user device join request would be in accordance with Multicast Listener Discovery (MLD) protocol as described, e.g., in IETC RFC 3810.

Upon receiving the join request from user device 12-1, and assuming other conditions such as those described below are satisfied, local router 14 configures itself to forward data packets associated with the joined multicast group to user device 12-1. In some embodiments, local router 14 may perform this configuration by identifying the port used for communication with user device 12-1 and then noting (e.g., by adding a port identifier to a forwarding list) that data packets with a <mcast IP dest01> destination address should be forwarded over that port. Local router 14 may also send its own join request containing <mcast IP dest01> to regional router 27. The join request from local router 14 may also be an IGMP or MLD join request. In some embodiments, the local router 14 join request may be a PIM (Protocol Independent Multicast) join request. PIM is described, e.g., in IETF RFC 4601. In response to a join request from local router 14, regional router 27 will forward <mcast IP dest01> packets on a port used to communicate with local router 14. Similar operations are performed at regional router 27 and other routers between regional router 27 and content providers 33, 32 and 31.

As indicated above, local router 14 typically will only accept a user device join request if certain conditions are satisfied. In particular, local router 14 will only accept user device join requests that seek to join a multicast group identified in a content distribution map stored, for example, at router 14. If local router 14 receives a user device join request seeking to receive content data packets having a multicast address not specified by that content distribution map, local router 14 will not send a join request to regional router 27 for that multicast address, and content data packets having that address will not be sent from regional router 27 to local router 14.

Figure 2:
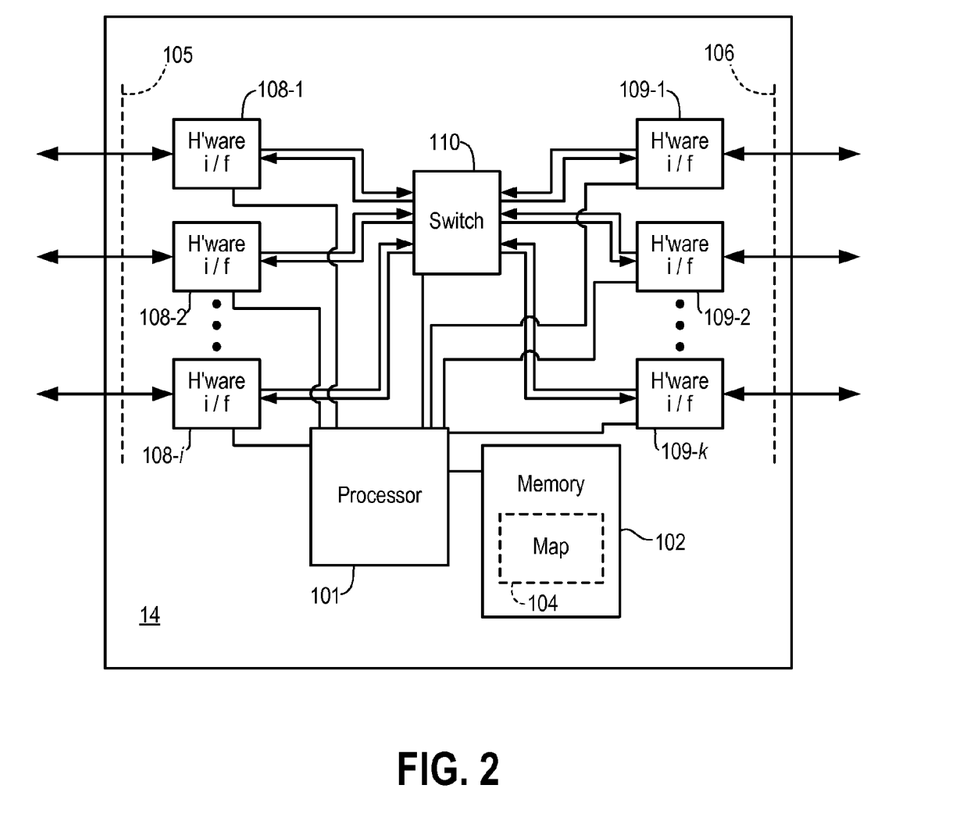
FIG. 2 is a partially schematic block diagram of local router according to at least some embodiments.

FIG. 2 is a partially schematic block diagram of local router 14 according to at least some embodiments. Local routers 18, 22 and 26, as well as other local routers in network 10, may be similar to local router 14 and operate in a similar manner. A processor 101 executes instructions and controls operation of local router 14 so as to carry out operations described herein. Local router 14 further includes memory 102 storing instructions for execution by processor 101 as well as other data that is stored and/or retrieved by processor 101. Data stored on memory 102 includes one or more content distribution maps 104, routing tables and other data. Although single blocks are shown for processor 101 and for memory 102, memory and computational operations of local router 14 could respectively be distributed across multiple memory devices and multiple processors. Memory 102 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 101 may be implemented with any of numerous types of devices, including but not limited to one or more general purpose microprocessors, one or more application specific integrated circuits, one or more field programmable gate arrays, and combinations thereof. In at least some embodiments, processor 101 carries out operations described herein according to machine readable instructions stored in memory 102 and/or stored as hardwired logic gates within processor 101.

Local router 14 communicates with regional router 27 and/or other network elements over a network-side interface 105, and with user devices user devices 12-1 through 12-n over an access-side interface 106. Interface 105 may include multiple hardware interface cards 108-1 through 108-i providing multiple physical ports for communication with regional router 27 and other network-side elements. Similarly, interface 106 may include multiple hardware interface cards 109-1 through 109-k that provide physical ports for communication with user devices 12-1 through 12-n and other access-side elements (not shown). For simplicity, inbound and outbound queue buffers and other components of hardware interface cards 108 and 109 are not shown. In some embodiments, hardware interface cards 108 and 109 could be Gigabit Ethernet cards. In other embodiments, some or all of the hardware interfaces over which local router 14 communicates with external devices could be cards (or other components) that send and receive data using some other packet network protocol.

Processor 101 may control a hardware switch 110 to forward packets received on a port of interface 105 over one or more ports of interface 106. Processor 101 may add data to (and/or strip data from) packet headers as the packets pass through switch 110. Processor 101 can also generate packets and forward those packets to hardware interfaces 108 and 109 for transmission on ports of interface 105 and interface 106.

As indicated above, local router 14 may store a content distribution map 104 in memory 102. Among other data, map 104 specifies multicast distribution groups that user devices in access network 13 are permitted to join. In some ways, map 104 may be analogous to a "channel map" used in many television networks to list available programming services and information about those services. Other local routers in network 10 may also store a content distribution map, but the maps stored on different local routers may specify different sets of multicast groups. Content distribution map 104 can reach local router 14 in any of various methods. In some embodiments, map 104 and updates to map 104 are provided to router 14 via a multicast signal. In particular, router 14 might be configured to join a multicast group associated with content distribution maps and updates to such maps, and may extract map data from packets having a multicast IP address corresponding to the map data multicast group.

Figure 3:
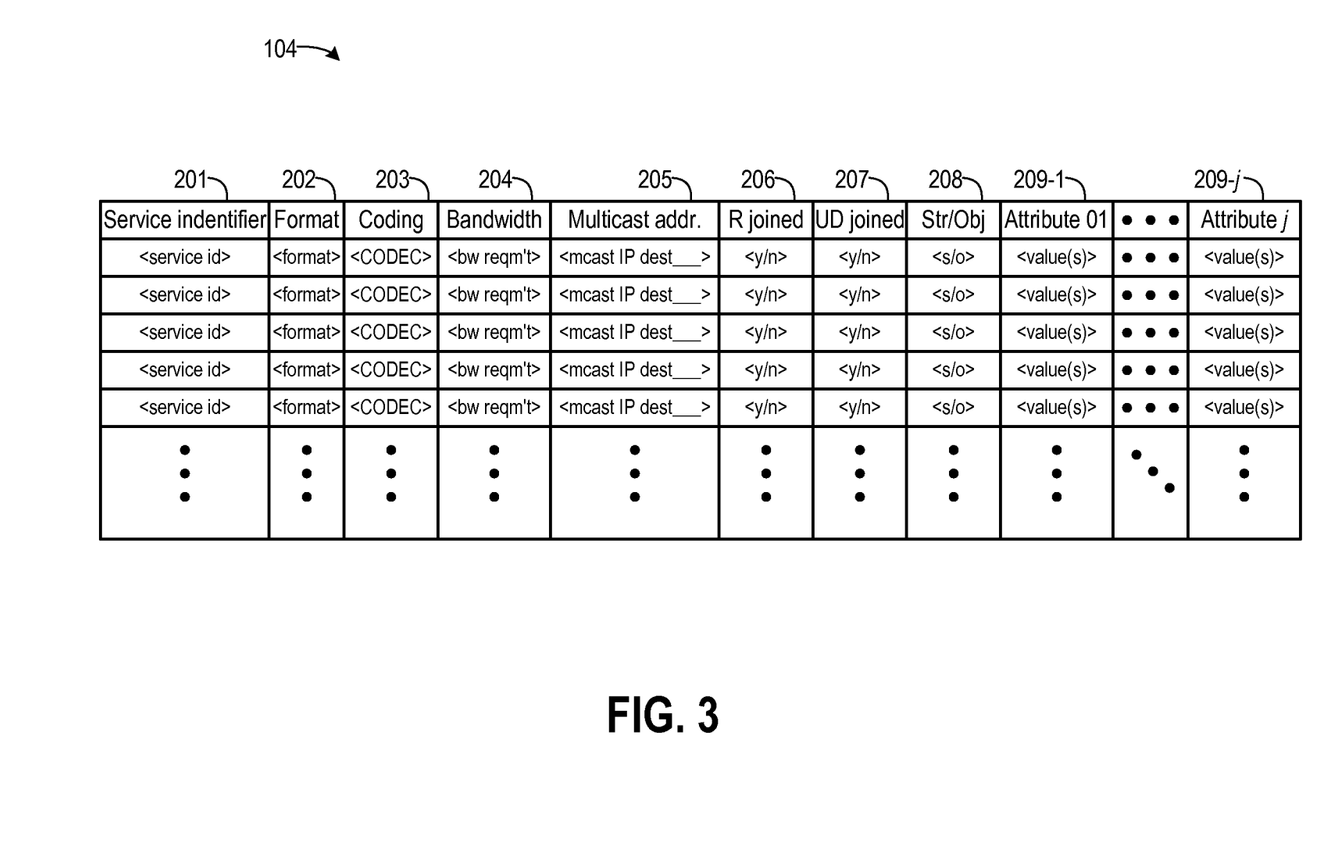
FIG. 3 shows details of data in a content distribution map according to at least some embodiments.

FIG. 3 shows exemplary details of the data in content distribution map 104. The table of FIG. 3 is merely one example of how content distribution data can be arranged in accordance with some embodiments. The actual format of data and/or of the tables or other data structures used to organize that data will vary among different embodiments. Each row of map 104 may correspond to a separate programming service.

In some cases, a service may correspond to one or more data streams representing all data needed for a particular media asset. For example, a service may correspond to a data stream that includes packets containing data encoding the audio portion of the asset and to a data stream that includes packets containing data encoding the video portion of the asset. In some cases, each of multiple services might represent a different version of a particular content. For example, video for television program B may be available in both standard definition (SD) and in high definition (HD) versions. Moreover, the audio for program B might be available in multiple languages. A first service might correspond to a data stream in which packets carry data encoding the SD version of B video and to a data stream in which packets carry data encoding an English language version of B audio. A second service might correspond to a stream in which packets carry data encoding the HD version of B video and to a stream in which packets carry data encoding a Spanish language version of B audio. Still other services may represent other versions of B and correspond to streams carrying the associated data for those versions.

Each field in column 201 of map 104 holds an identifier for the service corresponding to the row in which the field is located. The service identifier could include a character string portion that a human user would recognize as an identifier for a particular service provider (e.g., "HBO," "ESPN"). The service identifier might also include (or might alternatively consist of) a number assigned to uniquely identify a service. For convenience, fields of column 201 are populated with an angle-bracketed expression ("<service id>"). Such expressions merely indicate, in a generic manner, different values for the type of information that can be contained in column 201 fields. A similar convention is followed to generically show different values in other columns.

Each field in column 202 holds a value or indication of the format of the service corresponding to the row in which the field is located. Examples of formats could include HD, SD, stereo, mono, etc. Each field in column 203 holds one or more values indicating the type of audio CODEC (COder DECoder) and/or video CODEC used to encode data for the service on the corresponding row. Continuing with a previous example, SD versions of program B could use one type of video CODEC and HD versions of program B might use a different type of video CODEC. In some embodiments, there might also be additional versions of program B using different SD CODECs and/or additional versions of program B using different HD CODECs (e.g., to accommodate different types of user devices). Other information that might be included in column 203 fields includes whether content is MPEG-2 or MPEG-4 encoded. Similar audio content could also be transmitted in separate services using different audio CODECs.

Each field in column 204 may have a value indicating the bandwidth requirements for the corresponding service on the row. "Bandwidth" here refers to a measurement of information carrying capacity (e.g., in megabits/second). Entries in column 204, together with information about current data traffic levels, can be used to determine whether there is sufficient free bandwidth on a particular data path to begin forwarding data for a service. Such a data path could be a port emanating from a particular hardware interface card that serves a specific subset of user devices in an access network. Exemplary use of data in column 204 is further described below.

Each field in column 205 holds a value indicating the destination IP address for the multicast group associated with the corresponding service on the same row. As indicated above and described below in connection with FIG. 4, local router 14 compares addresses in map 104 with multicast addresses in user device join requests to determine whether access to a requested service is permitted. Each multicast address in column 205 thus specifies a different multicast group that at least some of the user devices and/or other devices in access network 13 are permitted to join. In some embodiments (e.g., embodiments utilizing IGMP v3), fields in column 205 may also hold values indicating source IP addresses for multicast groups. Alternatively, these source IP addresses for multicast groups could be contained in fields of a separate column. These source IP addresses for multicast groups could also (or alternatively) be used in determining whether user devices are permitted to join multicast groups.

In some embodiments, the data needed for a complete version of a particular content might correspond to separate services. For example, data for an HD version of program C video might correspond to a service having a particular multicast address, data for an SD version of program C video might correspond to a separate service having a different multicast address, data for the English version of program C audio may correspond to yet another service with yet another multicast address, etc. In order to create a complete version of program C, a user device would thus need to join one of the multicast groups associated with program C video and one of the multicast groups associated with program C audio.

Each field in column 206 holds a value ("yes" or "no," for example) indicating whether local router 14 is currently joined to the multicast group for the corresponding service on the same row. Before local router 14 can forward content data packets associated with a multicast group to user devices in access network 13, local router 14 must join that multicast group in order to receive those content data packets from regional router 27. If local router 14 receives a user device join request identifying a multicast group to which local router 14 is not currently joined, router 14 can generate and send a join request to regional router 27. Conversely, local router 14 need not send a join request to regional router 27 if local router 14 receives a user device join request identifying a multicast group which local router 14 has already joined in response to a previous user device join request.

Each field in column 207 of map 104 holds a value that indicates whether any user devices in access network 13 are currently joined to the multicast group for the corresponding service on the same row. If local router 14 is joined to a multicast group but there cease to be any user devices joined to that same group, local router 14 can generate and send a multicast group "leave" (or "prune") message to regional router 27 so that regional router 27 may stop forwarding packets for that multicast group to local router 14.

Each field on column 208 of map 104 holds a value that indicates whether the content data for the corresponding service on the same row is delivered as a "stream" or as one or more "objects." In the examples thus far, it has been assumed that content data for a service is delivered in the form of a data stream that continues as long as the service is available. In some embodiments, however, content data for a service may be delivered as a discrete (and smaller) number of data fragment objects. For an "object" type of service, information about that service can be provided to user devices in a manifest file that is also contained in one or more data packets having the multicast destination address associated with the object-type service. Alternatively, a field in map 104 corresponding to an object-type service could contain a URL or URI for a network resource that can be accessed by the user device to retrieve a service manifest. This URL or URI could be provided to the user device by router 14 at the time the user device joins the multicast group for the service in question.

Fields in columns 209-1 through 209-j may hold values for additional attributes of corresponding services on the same rows. As described in more detail below, some services/multicast groups may be permitted in a particular access network, but not be permitted as to all user devices in that access network.

Figure 4:
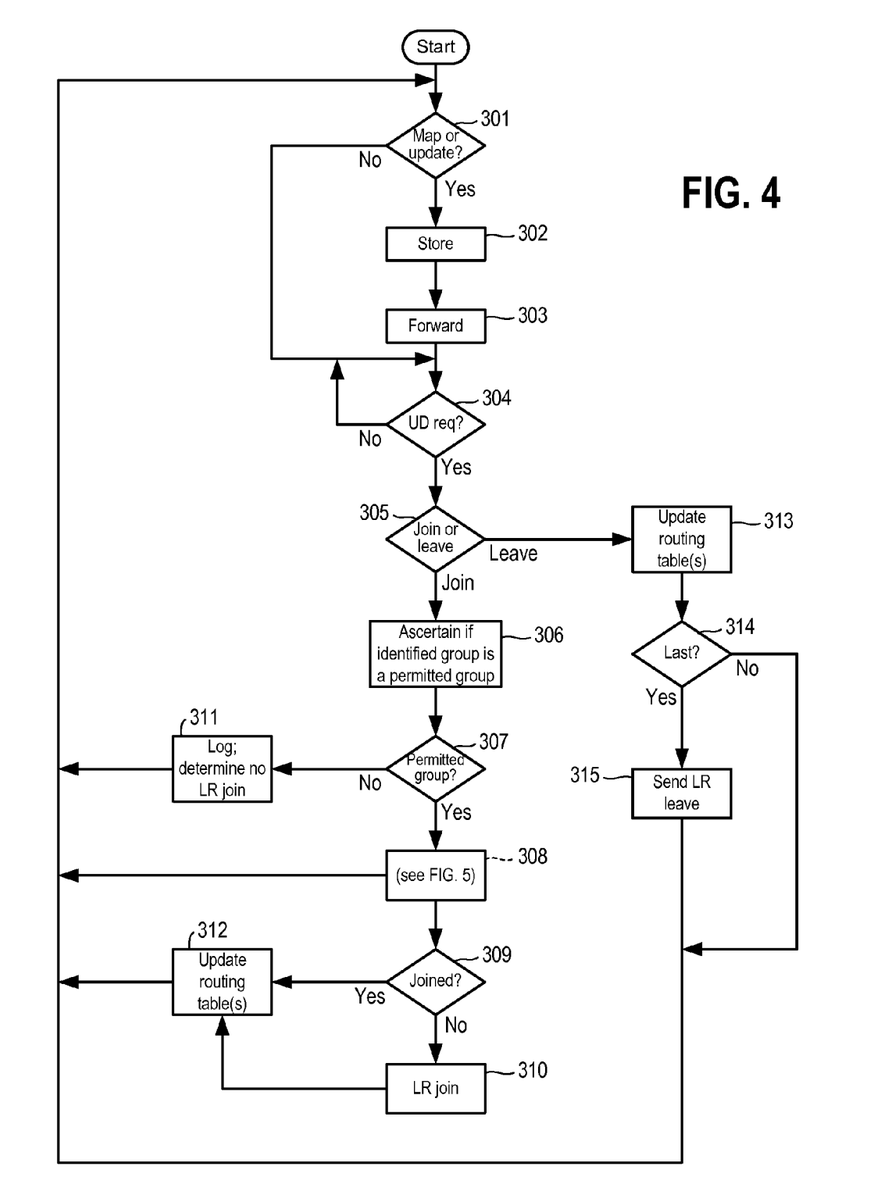
FIG. 4 is a flow chart showing operations performed by a local router according to at least some embodiments.

FIG. 4 is a flow chart for an exemplary algorithm performed by local router 14 according to at least some embodiments. The algorithm of FIG. 4 may be carried out by processor 101 of local router 14 according to instructions stored in memory 102 as executable code and/or according to hardwired logic instructions within processor 101. As can be appreciated from FIG. 4 and the following description, processor 101 may carry out the algorithm of FIG. 4 in multiple iterations. For example, the following description may relate to actions taken in a single iteration in connection with a user device request received during that iteration.

After initialization, and beginning at block 301, local router 14 may determine if it has access to or has received an initial or updated content distribution map. A content distribution map can be received across interface 105 at local router 14 from a network-side element of network 10. If a content distribution map has not been received (e.g., if block 301 is reached during a subsequent algorithm iteration), local router 14 proceeds to block 304 (described below) on the "No" branch. If a content distribution map has been received, local router 14 proceeds to block 302 on the "Yes" branch and stores the received content distribution map in memory 102 (FIG. 2).

Next (block 303), local router 14 forwards at least a portion of the newly-received content distribution map to user devices 12-1 through 12-n across interface 106. In some embodiments, the content distribution map is also utilized by user devices as a source of information about available services. In at least some such embodiments, information from the content distribution map is utilized by an user devices or other user device to generate an onscreen service guide from which a user can select a service for viewing. Once a user has selected a desired service, the user device can obtain the multicast destination IP address (and the multicast group's source IP address, if needed) for the selected service and send a join request for that service to local router 14.

From block 303, local router 14 proceeds to block 304 and determines if a user device join request or a user device leave request has been received from any of user devices 12-1 through 12-*n* over interface 106. If not, local router 14 loops back to block 304 on the "No" branch until a user device join or leave request is received. If a user device join or leave request has been received, local router 14 proceeds to block 305 on the "Yes" branch. If the received request is a user device leave request, local router 14 proceeds to block 313 on the "Leave" branch. Blocks 313 through 315 are described below. If the received request is a user device join request, the algorithm continues to block 306.

In block 306, local router 14 compares a multicast destination IP address identified in the received user device join request with the permitted multicast destination IP addresses (column 205, for example) in the stored content distribution map 104. Local router 14 might also (or alternatively) compare a multicast group's source IP address identified in the received user device join request with permitted multicast group source IP addresses in the stored content distribution map 104. Local router 14 then ascertains whether the user device is attempting to join a permitted multicast group. If the user device join request identifies a multicast destination and/or source IP address that is not specified in the content distribution map as a permitted multicast group, the user device has identified and is attempting to join a multicast group for a service that is not authorized for user devices in access network 13. In such a circumstance, local router 14 ("LR") proceeds on the "No" branch from block 307 to block 311. Local router 14 logs the attempt to access an unauthorized service in block 311. Information in a log of such attempts might later be utilized to identify users that have attempted to violate a contract with the operator of network 10. Local router 14 also determines in block 311 that it will not attempt to join the multicast group identified by the received user device join request, and local router 14 will thus not send a local router join request containing the multicast destination and/or source IP address identified by the received user device join request. From block 311, local router 14 returns to block 301 to begin the next algorithm iteration.

If local router 14 ascertains in block 306 that a received user device join request identifies a multicast destination and/or source IP address that is specified in the content distribution map, local router proceeds on the "Yes" branch from block 307. In this circumstance, the user device join request has identified and is attempting to access a multicast group for a service that is authorized for user devices in access network 13. That authorization may be subject to additional constraints, however. Accordingly, and as shown by block 308, local router proceeds to determine whether any applicable constraints may be violated.

Figure 5:
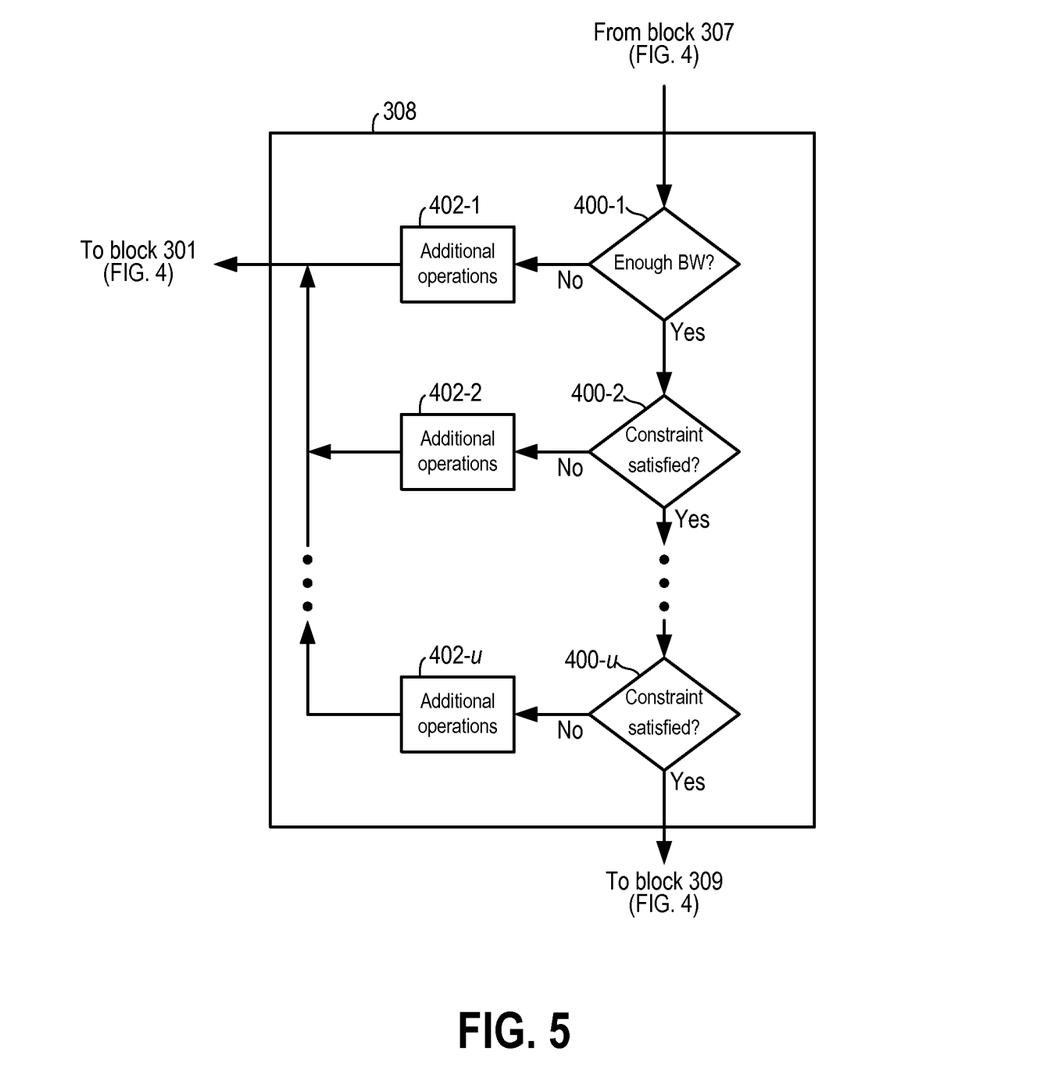
FIG. 5 is a flow chart showing additional operations in a block of the flow chart of FIG. 4.

FIG. 5 is a flow chart showing additional details of block 308. In block 400-1, local router 14 determines if there is sufficient available bandwidth in access network 13 to send data for the requested multicast group. For example, the user device join request may have identified a multicast destination and/or source IP address for an HD service having a relatively large bandwidth requirement, and the request may have been received at a time of heavy access network traffic. Under some such conditions, there may be insufficient available access network bandwidth to forward data for the requested HD service. If an HD service has been requested and there is not sufficient access network bandwidth to accommodate the bandwidth requirement for that HD service (shown, for example, in column 204 of map 104), local router 14 proceeds on the "No" branch to block 402-1. After performing one or more additional operations in block 402-1 (e.g., logging the condition, sending a "service temporarily unavailable message" to the requesting user device, etc.), local router 14 proceeds to block 301 of FIG. 4.

If local router 14 determines in block 400-1 that there is sufficient available bandwidth in access network 13 to send data for the requested multicast group, local router 14 proceeds on the "Yes" branch to evaluate whether additional constraints on forwarding the requested service are satisfied. The presence of an arbitrary number of additional determination steps for additional constraints are shown in FIG. 5 by blocks 400-2 through 400-*u*. One example of such a constraint could include determining whether the user device join request was received on a specified port of interface 106. In particular, access network 13 could be configured so that some user devices authorized to receive a particular service (e.g., devices associated with users paying a higher subscription fee) communicate with local router 14 over one set of ports and other user devices communicate over a different set of ports.

For each additional constraint tested in blocks 400-2 through 400-*u* that is satisfied (or determined to be inapplicable), local router 14 proceeds on the "yes" branch. If any constraint is applicable but not satisfied, local router 14 proceeds on the "No" branch to a block representing appropriate additional operations (one of blocks 402-2 through 402-*u*). If all applicable constraints in block 308 are satisfied (i.e., local router 14 proceeds on the "Yes" branch of each of blocks 400-1 through 400-*u*), local router 14 proceeds to block 309 of FIG. 4. In some embodiments, block 308 may only contain one or two additional constraint evaluations regarding the requested service. In still other embodiments, block 308 is not included and local processor 14 proceeds directly to block 309 on the "Yes" branch from block 307.

Upon reaching block 309 of FIG. 4, local router 14 determines if local router 14 is currently joined to the multicast group that has been identified in the join request being processed in the current iteration. For example, the user device join request may have requested a service that was previously requested by (and for which content data is currently being forwarded to) another user device in access network 13. In such a case, local router 14 would have already joined that multicast group in response to the previous request and would already be receiving data for that multicast group across interface 105. If local router 14 is currently joined to the requested multicast group, it proceeds on the "Yes" branch to block 312 and updates its routing tables to indicate that IP packets having the multicast destination IP address of the requested service should be forwarded on the interface 106 port over which local router 14 communicates with the user device that sent the join request currently being processed. Local router 14 then returns to block 301 for another iteration of the FIG. 4 algorithm. If local router 14 determines in block 309 that it is not currently joined to the requested multicast group, local router 14 proceeds to block 310. Local router 14 then generates a local router join request that identifies the multicast destination and/or source IP address identified in the received user device join request and forwards the generated local router join request to regional router 27 across interface 105. Local router 14 then proceeds to block 312.

Returning to block 305, if local router 14 determines that a received user device request is a "leave" request indicating a particular user device no longer wishes to receive data for a multicast group identified in that leave request, local router 14 proceeds on the "Leave" branch. Local router 14 determines in block 313 if it must update its routing tables for the interface 106 port used to communicate with the user device sending the leave request. If none of the other user devices with which local router 14 communicates over that same port are currently joined to the multicast group in question, then local router 14 can cease forwarding content data for that multicast group on that port. Conversely, local router 14 will continue to forward content data packets for that multicast group on that port if other user devices are still joined to that group.

After updating the routing table (if necessary) in block 313, local router 14 proceeds to block 314 and determines if there are other user devices in access network 13 that remain joined to the multicast group in question. Even if local router 14 determines in block 313 that no other devices on the relevant port are joined to the relevant multicast group, user devices on other ports might be joined to that multicast group. If the user devices sending the leave request is the last user device in access network 13 to have been joined to the multicast group, local router 14 proceeds to block 315. Local router 14 then generates a local router leave (or prune) request and forwards same to regional router 27 across interface 105. In this manner, bandwidth in the link between regional router 27 and local router 14 can potentially be saved by no longer transmitting content data that no users wish to receive. From block 315, or from the "No" branch of block 314 if other user devices remain joined to the multicast group in question, local router 14 returns to block 301 to start another algorithm iteration.

Other local routers in network 10 (FIG. 1) perform algorithms similar to that described in connection with FIGS. 4 and 5, but based on different content distribution maps stored those local routers. For example, content distribution maps stored at each of local routers 14, 18 and 22 may include a multicast destination and/or source IP address for a service emanating from content provider 33. However, that service is not available to user devices in the local region in which access network 25 is located. Accordingly, a content distribution map stored at local router 26 does not include the multicast destination and/or source IP address for the service emanating from provider 33.

As indicated above, various embodiments can be implemented in networks using IPv4, in networks using IPv6, and in networks using both IPv4 and IPv6 (e.g., IPv4 in some areas and IPv6 in others). However, the invention is not limited to embodiments that employ IPv4 or IPv6, and includes embodiments utilizing other versions and/or protocols other than IP.

The flow charts of FIGS. 4 and 5 merely represent examples of algorithms according to some embodiments. Other embodiments include algorithms in which various steps shown in FIGS. 4 and/or 5 might be rearranged, omitted and/or replaced with different steps.

Additional embodiments include numerous other variations. For example, a content distribution map could include other types of data (e.g., a source IP address associated with a service), and/or may not include all of the data types described in connection with FIG. 3. As but another example, a user device join or leave request could identify more than one multicast group. In some such embodiments, the local router compares each identified multicast group in a user device join request to permitted groups specified in a content distribution map and only attempts to join multicast groups that are permitted. In other such embodiments, the local router does not attempt to join any of the multicast groups identified in a user device join request unless all are permitted groups.

In some embodiments, a user device may be a home gateway or other type of device that includes a memory for caching service data and that includes one or more processors configured to cache data for a service before a user has attempted to access that service. For example, map 104 might include object-type services R, S, T, U and V. Each of these services might also be defined as "cacheable." Users of a first home gateway in the router 14 service area might currently be accessing services R and S only, which accessing could be noted in appropriate fields of map 104. In response to one or more communications from router 14 regarding other cacheable services currently available in the router 14 service area, the first home gateway might join the multicast groups for T, U and/or V so as to download and cache objects for services T, U and/or V irrespective of whether a user of the first home gateway has attempted to access one of those services. If a user of the first home gateway should later attempt to access one of those cached services, the first home gateway can simply output the service data from its own memory and need not obtain that data from the network. This scheme could allow more efficient utilization of network resources by transmitting data to user devices for caching at times of lower access network traffic. Various types of rules can be programmed into a home gateway to achieve such caching. As one example, a user might explicitly program the gateway to cache certain services (e.g., instruct the gateway to always cache HBO). As another example, a home gateway could be configured to monitor services occasionally accessed by a user and to cache those services (and/or cache similar services) at times when a user has not attempted to access those services.

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a router or other network device to carry out operations such as are described herein. As used herein (including the claims), a machine-readable storage medium is a physical structure that can be touched by a human. A signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention. In the claims, terms such as "first," "second," etc. are used to differentiate among features and do not (in the absence of language to the contrary) have temporal significance.

The invention claimed is:

1. A method comprising:
    receiving, by a computing device from one or more devices in communication with the computing device via an access network, one or more request communications requesting access to a multicast group;
    identifying, by the computing device, a bandwidth requirement for the multicast group from information specifying multicast groups to which the one or more devices are permitted access;
    using the bandwidth requirement and information describing current data traffic levels for the access network to determine whether there is sufficient bandwidth on the access network to begin transmitting data of the multicast group to the one or more devices; and
    conditioned upon determining that there is sufficient bandwidth on the access network to begin transmitting data of the multicast group to the one or more devices, transmitting, by the computing device, one or more communications requesting membership in the multicast group.

2. The method of claim 1, further comprising:
    responsive to a determination, based on the information specifying multicast groups to which the one or more devices are permitted access, that at least one device is requesting access to a non-permitted multicast group, causing the computing device to not transmit a communication requesting membership in the non-permitted multicast group.

3. The method of claim 1, further comprising:
    in response to the one or more communications requesting membership to the multicast group, receiving, by the computing device, multicast data packets that comprise content associated with the multicast group; and
    forwarding the content from the computing device to the one or more devices via the access network.

4. The method of claim 1, wherein the information specifying multicast groups to which the one or more devices are permitted access comprises, for a first multicast group, data specifying one or more conditions on accessing the first multicast group, and wherein the method further comprises:
    for a first device requesting access to the first multicast group, determining, by the computing device, whether the one or more conditions are satisfied; and
    in response to determining that the one or more conditions are not satisfied, causing the computing device to not transmit a communication requesting membership in the first multicast group.

5. The method of claim 1, further comprising:
    identifying, by the computing device, a port from the information specifying multicast groups to which the one or more devices are permitted access;
    wherein the transmitting of the one or more communications is further conditioned upon a determination that the one or more request communications were received by the computing device via the port.

6. The method of claim 1, further comprising:
    transmitting, to the one or more devices, at least a portion of the information specifying multicast groups to which the one or more devices are permitted access.

7. The method of claim 1, further comprising:
    storing, at each of the one or more devices, the information specifying multicast groups to which the one or more devices are permitted access;
    based on the information specifying multicast groups to which the one or more devices are permitted access, causing a first device of the one or more devices to generate a service guide that enables a user to select a service that is associated with the multicast group; and
    responsive to the user selecting the service, transmitting, from the first device, a first request communication that requests access to the multicast group.

8. The method of claim 1, wherein the one or more devices are one or more first devices, and the method further comprises:
    storing, at a second computing device, information specifying multicast groups to which one or more second devices are permitted access, wherein the one or more second devices are associated with a geographic region different from a region associated with the one or more devices; and
    transmitting, by the second computing device to the one or more second devices, data for at least one of the multicast groups to which the one or more second devices are permitted access.

9. The method of claim 1, wherein the information specifying multicast groups to which the one or more devices are permitted access comprises an indication for each of the one or more permitted multicast groups whether content data is delivered as a stream or as one or more objects.

10. The method of claim 1, further comprising:
    receiving a request communication that requests access to multiple multicast groups;
    based on the information specifying multicast groups to which the one or more devices are permitted access, determining, by the computing device, that a first of the multiple multicast groups is one of the multicast groups to which the one or more devices are permitted access and that a second of the multiple multicast groups is not any of the multicast groups to which the one or more devices are permitted access; and
    conditioned upon determining that the first of the multiple multicast groups is one of the multicast groups to which the one or more devices are permitted access and that the second of the multiple multicast groups is not any of the multicast groups to which the one or more devices are permitted access, causing the computing device to not transmit a communication requesting membership in the multiple multicast groups.

11. The method of claim 1, wherein each of the one or more request communications comprises a destination internet protocol (IP) address and a source IP address corresponding to the multicast group;
    wherein the information specifying multicast groups to which the one or more devices are permitted access comprises a specified destination IP address and a specified source IP address; and
    wherein the method further comprises determining whether the multicast group is one of the multicast groups to which the one or more devices are permitted access based on both a comparison of the destination IP address and the specified destination IP address and a comparison of the source IP address and the specified source IP address.

12. The method of claim 1, wherein the access network comprises a hybrid fiber-coax network.

13. The method of claim 1, wherein the access network comprises a passive optical network.

14. The method of claim 1, wherein the access network comprises a wireless access network.

15. The method of claim 1, wherein the computing device comprises a router.

16. The method of claim 1, further comprising:
accessing, by the computing device, the information specifying multicast groups to which the one or more devices are permitted access to identify an indication of whether the computing device has joined the multicast group;
wherein the transmitting of the one or more communications is further conditioned upon a determination that the indication of whether the computing device has joined the multicast group indicates that the computing device has not joined the multicast group.

17. The method of claim 1, further comprising:
receiving an update to the information specifying multicast groups to which one or more devices are permitted access.

18. A method comprising:
receiving, by a computing device, information specifying multicast groups one or more devices are permitted access, the one or more devices being in communication with the computing device via an access network;
identifying, by the computing device, a first bandwidth requirement for a first multicast group from the information specifying multicast groups to which the one or more devices are permitted access;
conditioned upon a determination, using the first bandwidth requirement and first information describing current data traffic levels for the access network, that there is sufficient bandwidth on the access network to begin transmitting data of the first multicast group to the one or more devices, transmitting, by the computing device, one or more communications requesting membership in the first multicast group;
receiving, by the computing device, an updated version of the information specifying which multicast groups to which the one or more devices are permitted access;
identifying, by the computing device, a second bandwidth requirement for a second multicast group from the updated version of the information specifying multicast groups to which the one or more devices are permitted access; and
conditioned upon a determination, using the second bandwidth requirement and second information describing current data traffic levels for the access network, that there is sufficient bandwidth on the access network to begin transmitting data of the second multicast group to the one or more devices, transmitting, by the computing device, one or more communications requesting membership in the second multicast group.

19. A method comprising:
receiving, by a computing device, information specifying multicast groups to which one or more devices are permitted access, the one or more devices being in communication with the computing device via an access network;
using the information specifying multicast groups to which one or more devices are permitted access and first information describing current data traffic levels for the access network to determine whether there is sufficient bandwidth on the access network to begin transmitting data of a first multicast group;
allowing the one or more devices to join the first multicast group if there is sufficient bandwidth on the access network to begin transmitting data of the first multicast group;
receiving, by the computing device, an updated version of the information specifying multicast groups to which the one or more devices are permitted access;
using the updated version of the information specifying multicast groups to which one or more devices are permitted access and second information describing current data traffic levels for the access network to determine whether there is sufficient bandwidth on the access network to begin transmitting data of a second multicast group; and
transmitting one or more communications requesting membership in the first multicast group or the second multicast group.

20. The method of claim 19, wherein receiving the information specifying multicast groups to which the one or more devices are permitted access comprises receiving the information specifying multicast groups to which the one or more devices are permitted access via a third multicast group;
wherein receiving the updated version of the information specifying multicast groups to which the one or more devices are permitted access comprises receiving the updated version of the information specifying multicast groups to which the one or more devices are permitted access via the third multicast group.

* * * * *